(12) United States Patent
McGrath

(10) Patent No.: US 10,692,519 B1
(45) Date of Patent: Jun. 23, 2020

(54) ADJUSTABLE SEEK ENERGY SETTINGS IN STORAGE DEVICE SYSTEMS

(71) Applicant: MICROSOFT TECHNOLOGY LICENSING, LLC, Redmond, WA (US)

(72) Inventor: Michael Sean McGrath, Redmond, WA (US)

(73) Assignee: Microsoft Tchnology Licensing, LLC, Redmond, WA (US)

( * ) Notice: Subject to any disclaimer, the term of this patent is extended or adjusted under 35 U.S.C. 154(b) by 0 days.

(21) Appl. No.: 16/292,237

(22) Filed: Mar. 4, 2019

(51) Int. Cl.
*G11B 5/02* (2006.01)
*G06F 13/20* (2006.01)

(52) U.S. Cl.
CPC ............... *G11B 5/02* (2013.01); *G06F 13/20* (2013.01); *G06F 2213/40* (2013.01)

(58) Field of Classification Search
None
See application file for complete search history.

(56) References Cited

U.S. PATENT DOCUMENTS

| 4,553,181 | A | * | 11/1985 | Berti | ............... | G05D 3/1454 |
| | | | | | | 318/626 |
| 6,498,695 | B2 | * | 12/2002 | Kosugi | ............... | G11B 5/553 |
| | | | | | | 360/29 |
| 7,606,944 | B2 | | 10/2009 | Kalwitz et al. | | |
| 8,364,992 | B2 | | 1/2013 | Guthrie et al. | | |
| 9,965,206 | B2 | | 5/2018 | Bass et al. | | |
| 2003/0174433 | A1 | | 9/2003 | Espeseth et al. | | |
| 2004/0255055 | A1 | * | 12/2004 | Lamberts | ............... | G11B 5/09 |
| | | | | | | 710/5 |
| 2009/0327598 | A1 | * | 12/2009 | Tamura | ............... | G06F 3/0613 |
| | | | | | | 711/112 |
| 2013/0024589 | A1 | * | 1/2013 | Yamauchi | ............... | G06F 13/24 |
| | | | | | | 710/263 |

(Continued)

OTHER PUBLICATIONS

"IO Queue Depth Strategy", Retrieved From: https://web.archive.org/web/20110519224156/http://www.qdpma.com/Storage/IoQueueDepthStrategy.html, May 19, 2011, 7 Pages.

(Continued)

*Primary Examiner* — Peter Vincent Agustin
(74) *Attorney, Agent, or Firm* — Shook, Hardy & Bacon, LLP

(57) ABSTRACT

Various methods and systems are provided for implementing classification-based adjustable seek energy settings in storage device systems. In particular, operations support adjusting seek energy settings for storage device components, for executing requests. In operation, a classification is selected for a request. The classification indicates a first priority level for executing the request. The priority level is associated with a first adjustable seek energy setting of a plurality adjustable seek energy settings for executing requests on the hard disk drive system, where a seek energy setting is an adjustable operational speed or energy setting for the hard disk drive system. Based on the classification indicating the priority level, the classification is transmitted to cause the hard disk drive system to set the adjustable seek energy setting. One or more hardware components of the hard disk drive system operates to execute the first request based on the first adjustable seek energy setting.

20 Claims, 11 Drawing Sheets

(56) References Cited

U.S. PATENT DOCUMENTS

2016/0148640 A1   5/2016   Zeid et al.

OTHER PUBLICATIONS

Khatib, et al., "PCAP: Performance-Aware Power Capping for the Disk Drive in the Cloud", In Proceedings of 14th USENIX Conference on File and Storage Technologies, Feb. 22, 2016, pp. 227-240.

* cited by examiner

400

| I/O CLASSIFICATION | PRIORITY LEVEL | SEEK ENERGY SETTING |
| --- | --- | --- |
| BLOCK READ | 1 (HIGHEST) | 15 M/S |
| FILE AND OBJECT READ | 2 | 10 M/S |
| MAINTENANCE TASKS | 3 | 8 M/S |
| DATA SCRUBBING | 4 | 5 M/S |
| DATA WRITE | 5 (LOWEST) | 3 M/S |

*FIG. 4.*

ADJUSTABLE SEEK ENERGY SETTINGS IN STORAGE DEVICE SYSTEMS

BACKGROUND

Users often rely on applications or services to quickly or efficiently perform computing tasks. In order to execute these computing tasks, these applications and services use one or more computing devices that read or write data to one or more storage devices (e.g., hard disk drives (HDD)). For example, a user may issue a query from a user interface that requests a particular set of data. Responsively, the request can be communicated over a network to one or more computing devices associated with the applications or services. These computing devices may have to, for example, identify an address (e.g., a logical block address) where the requested data is located at, cause one or more mechanical components of a hard disk drive (e.g., a read/write head) to find the correct address or track on the hard disk drive, and then return the data back to the user. Moreover, many of these applications or services are implemented in large scale distributed computing environments (e.g., cloud computing systems) where executing these user computing tasks occur multiple times and in parallel and can utilize a vast amount of energy. As such, these computing devices are faced with the challenge of quickly but efficiently performing computing tasks for users.

SUMMARY

Embodiments described herein are directed to methods, systems, and computer storage media, for providing adjustable seek energy settings in storage device systems. In particular, operations described herein support adjusting storage device component seek energy (e.g., speeding up the rate at which a read/write head of HDD operates to locate a track) for executing one or more requests (e.g., an input/output (I/O) request to delete a set of data) based on a particular classification (e.g., a highest priority classification) of the I/O requests.

Conventional methods and existing technologies fall short when providing a solution for prioritizing storage device system requests. For example, executing highly prioritized requests at relatively high speeds or rates relative to executing lower priority requests at lower speeds or rates are not executed in an energy efficient manner. By way of background, some existing storage device technologies execute requests (e.g., I/O requests) in the order they are received. Some technologies may also optimize the scheduling of requests where request data sets that are near each other on disk are batched or processed together. However, the seek energy setting at which components of the disk are operating are typically at a static and continuous level, which causes a large quantity of energy to be consumed and requests are not processed fast enough. Moreover, existing technologies disregard any priority level for the requests for adjusting execution speed of such requests. As such, improvements to the computing operations, functionality, and technological process of adjusting storage device component seek energy settings for executing one or more requests based on a particular classification of the requests can be defined to address the above-described problems and other limitations in existing technologies and systems of request management.

Accordingly, one example embodiment of the present invention provides improved storage device systems with operations for adjustable seek energy settings. In operation, a request (e.g., an I/O request for a hard disk drive system) is received. A classification (i.e., priority classification) is selected for the request. The classification indicates a priority level for executing the request. The priority level corresponds with an adjustable seek energy setting (i.e., an adjustable operational speed or energy setting for the hard disk drive system). The classification can be indicative of a request category classification (e.g., read, write, and maintenance) that a particular request belongs to and a priority level (e.g., high priority, medium priority, low priority) that the category is associated with. In some instances, the priority level indicates the importance or relevance of the particular requests or category of the requests relative to other requests or categories. In this manner, requests or categories of particular requests can be ranked or prioritized. A storage device system (e.g., an HDD system) can then set or configure an adjustable seek energy setting at which one or more components (e.g., a read/write head) of the storage device system operates to execute the one or more received requests based on the classification.

In addition, the configuring of the adjustable seek energy settings can be further based on other functionality, such as a queue depth of a queue associated with particular storage area (e.g., a volume) where a particular request is executed. The queue depth may be indicative of a particular quantity of requests that are pending within the queue associated. Alternatively or additionally, the adjustable setting of the seek energy setting can be further based on a position that one or more request are located at within a data structure, such as a queue. In some aspects, an application, operating system, and/or storage device system itself may be responsible for carrying out these steps.

In addition, an application and operating system component can process application requests having classifications that indicate priority levels that are associated with adjustable seek energy settings. In this manner, a classification can be transmitted based on a classification indicating a priority level. The transmitting of the classification causes one or more hardware components of a storage device system to operate to execute a request based on the adjustable seek energy setting.

As such, embodiments described herein improve the computing operations, functionality, and the technological process by at least configuring an adjustable seek energy setting for one or more storage device components operate such that requests having particular priority levels based on their corresponding classifications are processed accordingly. For example, particular highly prioritized requests are executed faster, and lower prioritized requests are executed slower relative to the highly prioritized requests at the corresponding adjusted seek energy setting. This improves management of power consumption, in that, decreases or increases in power consumption based on storage devices can be configured. Further improvements include: data structures (e.g., a configuration table) designed to store mappings of priority levels with seek energy settings, and an ordered combinations of steps for setting a seek energy setting based on I/O classification between components in a non-generic arrangement.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 4 is a schematic diagram of a configuration table, in which embodiments described herein may be employed;

DETAILED DESCRIPTION

Figure 1:
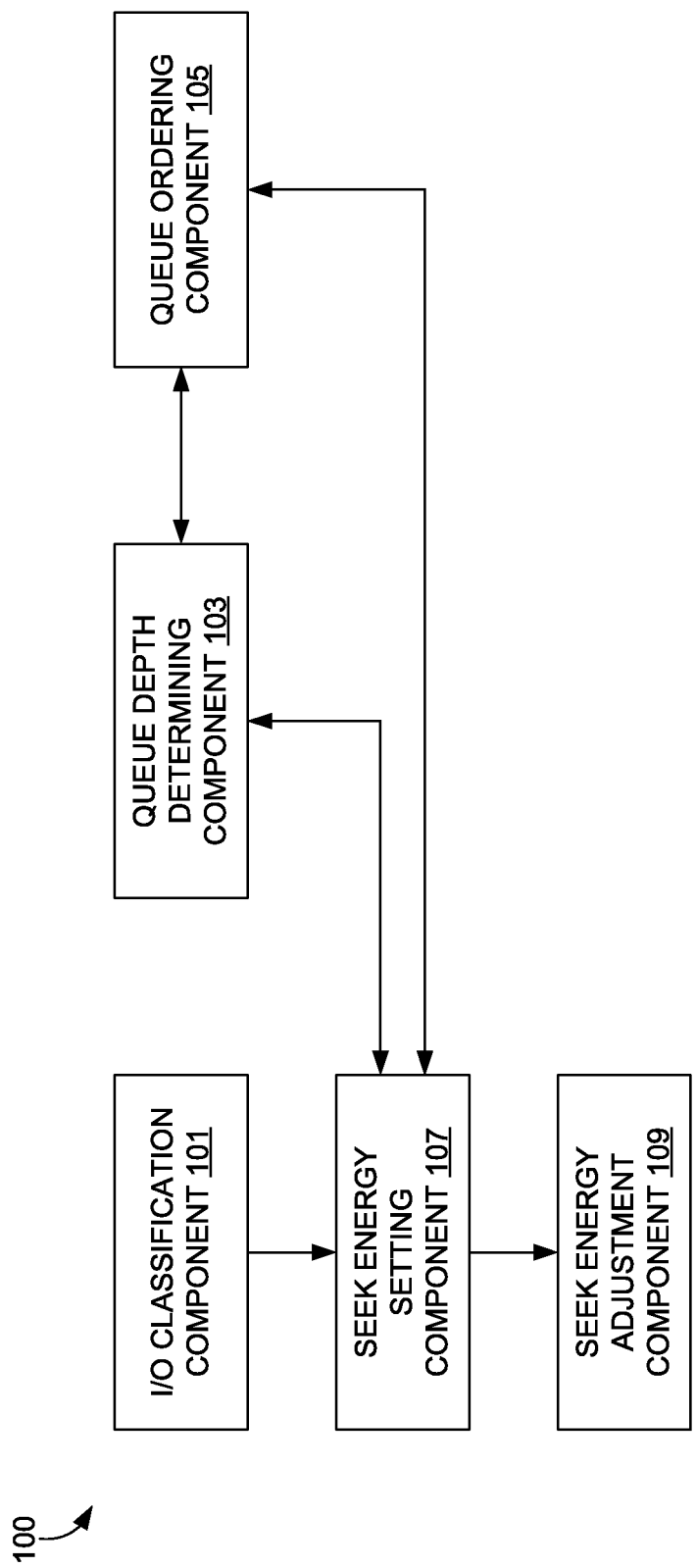
FIG. 1 is a block diagram of an example system, in which embodiments described herein may be employed.

Users often rely on applications or services to quickly or efficiently perform computing tasks. However, existing technologies do not adequately execute requests (e.g., I/O requests) in an efficient enough manner depending on types of requests or priority levels in various instances. This is partly because existing technologies include storage device systems that perform limited functionality. For example, a hard disk drive storage controller may only receive limited information from an application or operating system, such as only a logical block address (LBA) and timestamp associated with a particular request. Some existing technologies use this limited information to execute requests based on a FIFO (first-in-first-out) queue data structure. In these instances, requests are processed in the order in which they are received. The storage device controller simply identifies the LBA to determine where to execute the request and the timestamp to determine where to place the request in the Queue. This is problematic because a particular important or high priority request may be ordered last in a very large queue, which means that there will be latency (e.g., network latency) or decreased throughput involved with processing the request.

Some existing technologies use optimized queue data structures that batch requests that are near each other on disk. In this way, although particular I/O requests arrive at different time stamps, they may be processed together or consecutively so that hard drive components do not have to excessively move to execute the I/O requests. However, these technologies do not set priorities or classifications for I/O requests. This is problematic because the system may determine that there are various I/O requests in a queue that are near each other on disk and responsively choose to execute those I/O requests first, for example. However, all or a majority of these I/O requests may be low in priority such that executing them at a later time would have been appropriate. This leaves more important I/O request left to be processed at a later time, which leads to the latency and throughput problems described above. Moreover, the seek energy setting at which components of a storage device system is configured to is static and does not dynamically change according any criteria. This consumes an unnecessary amount of resources, such as power. This is particularly the case in distributed computing environments or data centers where even a small amount of energy that is consumed in excess on one disk multiplied by the thousands of disks in use causes a massive amount of energy and power to be consumed. As such, a comprehensive system that addresses the challenges identified above and other challenges is integral to providing improved storage device system management functionality.

Embodiments of the present invention provide simple and efficient methods and systems for providing adjustable seek energy settings in storage device systems. In particular, operations described herein support configuring adjustable seek energy settings (e.g., speeding up the read/write head of HDD to locate a track) for executing requests based on a particular classification having a priority level (i.e., priority classification) for executing the request. An "I/O" of an I/O request can be any suitable action performed against a storage device, such as a read of data from the storage device, a writing of data to a storage device, database or persistent storage operations (e.g., INSERT, DELETE, CREATE, UPDATE), maintenance operations (e.g., indexing), etc. Some or each of these I/O operations can be executed in response to particular user requests, such as requesting a set of data from a file as described above or requesting to change a set of data. A "classification" is indicative priority level of a request. The priority level corresponds with an adjustable seek energy setting (i.e., an adjustable operational speed or energy setting for the hard disk drive system). A classification may also indicate the priority level of the request based on a type or category (e.g., read/write/maintenance) of the request. In various embodiments, classifications having priority levels are assigned to requests based on whether the latency is critical, meaning that executing the request urgently or quickly within a threshold is important or more important than other requests.

"Seek energy setting", as used herein, refers to a speed and/or energy operational level for performing one or more operations in a storage device system. In some embodiments, seek energy is an operational setting that indicates to a component (e.g., a read/write head) how fast to go when executing a request with a particular classification. In some embodiments, the seek energy setting may be refereed to colloquially as "turbo mode" of a hard drive such that the speed at which the hard drive operates to execute a read or write is increased. Seek energy may additionally or alternatively include configuring the energy level that is consumed by one or storage device components for executing a particular I/O request. For example, the energy setting may be configured to a specific energy quantity per time slice (e.g., Joules per second) that one or more storage device components must consume when executing a particular I/O request.

In some embodiments, seek energy settings are "predetermined." This means that the seek energy setting configuration is determined in advance of an actual storage device component operating at a particular seek energy setting to execute a request. For example, the system may map an incoming request to a classification having a priority level of Y. A data structure (e.g., the configuration table 300 of FIG. 3) may then be queried to map the priority level Y to seek energy setting T. In response to this mapping or other set of rules to configure seek energy settings (i.e., the predetermined seek energy settings), the one or more storage device components may then physically operate at the speed level T based at least in part on this mapping. This is different than a storage device component that either randomly adjusts the seek energy to execute a request or adjusts speed levels based on other factors, such as speeding up a seek time or seek latency because the read/write head executed a first operation against the storage device, which was already in the same track or sector as a prior second operation.

In operation, one or more requests are received (e.g., over a computer network and from a user computing device). For example, the received one or more request can be a request from a user computing device that requests to read data from a file. In response, the one or more I/O requests are classified (e.g., by an application and/or operating system). The classification can be indicative of a priority level relative to other classifications. The classification may alternatively or additionally is indicative of a category or type of I/O request received.

Various vendors may create different classifications for different requests (e.g., via an API that communicates the classifications to an application and/or operating system). For example, a plurality of classifications may exist, such as "data read", "data write" and "maintenance" (e.g., data scrubbing, indexing, data mirroring, etc.). Each classification can be associated with a priority level (e.g., urgent, moderately urgent, or non-urgent). The priority level is indicative of how fast the I/O request needs to be processed relative to other types of I/O requests. Any suitable classification may exist. Using the illustration above, in response to the request to read data from a file, an application may generate a classification of "data read—priority 1" (e.g., highest priority). The classification may be represented as an ID in a non-payload or packet header information of an I/O request that is received. The classification may then be mapped to a priority level. For example, a request may include a packet header ID of 1, which is a data read. The ID can then be mapped to a priority level (e.g., via a hash table).

The classification can be transmitted to another component (e.g., an operating system component), which causes a storage device system (e.g., a hard disk drive controller) to set or configure a first seek energy setting at which one or more components of the storage device system operates in order to execute the particular I/O request. For example, in response to an application or operating system selecting a classification of an I/O request, the application or operating system may then transmit the classification to hard disk drive system. A storage controller of the hard disk drive system in particular embodiments identifies the classification and associates the classification to a seek energy setting. For example, the storage controller may interface with a configuration lookup table that includes a priority classification attribute and a predetermined seek energy setting attribute. The storage controller may then map the received classification ID under the classification attribute to a corresponding seek energy setting attribute ID under the associated attribute (e.g., both IDs are included in the same record). The storage controller may then cause one or more hardware components to operate at the configured seek energy setting.

It is contemplated that if the classification is associated with a highest priority, then the highest seek energy setting is configured without any other consideration. However, if the classification is not associated with a highest priority, then other factors may additionally or alternatively be used to configure the seek energy setting. For example, if a received request is associated with a middle tier priority, it may then be determined what the queue depth is of a queue associated with a storage area (e.g., a volume) where the request will be executed. Moreover if the queue depth is less than a threshold (e.g., 4 entries), then a lower seek energy setting is set (e.g., 5) relative to a seek energy setting (e.g., 10) that is set when the queue depth is greater than or equal to the same threshold. Alternatively or additionally, the seek energy settings are set based at least in part on the order of a particular I/O request in a queue data structure. For example, if there are 20 pending I/O requests in a queue, the first 5 may be executed at a speed level of 10, the next 5 I/O requests may be executed at a speed level of 5, and the last 10 I/O requests may be executed at a speed level of 2.

Components of a storage device can be configured at a seek energy setting based on priority classifications for requests. Responsively, the components perform at the configured seek energy settings. For example, in response to a storage controller mapping a priority 1 (e.g., highest priority) classification to a highest predetermined speed level (e.g., 10), a read/write head component of an HDD system may speed up seek time to the highest predetermined speed level to locate a track associated with a corresponding I/O request address. Alternatively or additionally, a spindle component of an HDD system may change its rotational speed to a faster corresponding level so that a read/write head can more quickly locate, at the particular speed level, a sector where the address is located within the track due to the faster rotational speed of the platter. In another example, in response to a storage controller mapping a priority 3 (e.g., lowest priority) classification to a lowest predetermined speed level (e.g., 2), a read/write head component of HDD system may slow down seek time to the lowest seek energy setting to locate a track associated with a corresponding I/O request address. Alternatively or additionally, a spindle of an HDD system may change its rotational speed to a slower corresponding level so that a read/write head more slowly locates a sector where the address is located at due to the lower rotational speed of a platter.

As such, advantageously, embodiments described herein improve existing technology by increasing throughput and decreasing network latency. This is the case especially for executing highly prioritized requests. The faster one or more components of a storage device operates, the faster the storage device reads or writes the data to or from the storage device to execute the I/O request. Embodiments described herein also improve computing resource consumption, such as reducing energy or power consumption among other things. This is especially the case for lower prioritized requests. The slower a read/write head operates to execute an I/O request, the less kinetic energy it consumes, thereby decreasing the amount of power utilized, since power is defined as an energy unit over a time unit. For example, when a HDD component reduces its speed from a first level to a second level, energy and power consumption are reduced during the time at which the HDD component executes an I/O request at the second level.

Turning now to the Figures, FIG. 1 is a block diagram of an example system 100, according to some embodiments. FIG. 1 shows a high level architecture of a system 100 that has an output of components of a storage device operating at a configured adjustable seek energy setting. The "components" (e.g., engines, modules, and managers) described in FIG. 1 can be any suitable tangible or logical component that is responsible for carrying out particular action. In some embodiments, all of the components within the system 100 are located on a same host computing device. In alternative embodiments, some or each of the components are only communicatively coupled such that some or each of the components are located on different host computing devices and communicate over a wired or wireless computer network (e.g., a WAN). For example, some or each of the components may be spread across a cloud computing network. In some embodiments, some or each of these components are managed by different layers. For example, in some embodiments, the I/O classification component 101 is managed by an application and/or operating system layer whereas the seek energy setting component 107, the seek energy adjustment component 209, queue depth determining component 103, and/or the queue ordering component 105 is managed by firmware or a storage controller associated with a storage device.

The I/O classification component 101 receives one or more requests (e.g., I/O requests) and selects one or more classifications for the one or more received requests. For example, the classification component 101 may receive a request and identify in a received packet header that the request has an ID of 1. A data structure may be generated, such as a hash table or lookup table. This data structure may include a classification ID attribute and a priority level attribute. Accordingly, the I/O classification component 101 in various embodiments associates the ID received from the I/O request to a priority level. For example, the I/O classification component 101 may map the received ID to a classification ID and to an associated priority. The mapping operation may occur via a lookup function to identify what priority value is included in the same record as the received classification ID. \

In various embodiments, there may be any suitable type and quantity of classifications and priorities available depending on application needs. Each priority classification may be configured differently for each entity or vendor (e.g., MICROSOFT Inc. of Redmond Wash., or Alphabet Inc., of Mountain View Calif.). In an example illustration of the types of classifications or priority levels that may exist, there may be a plurality of classifications as follows: "read," "maintenance," and "write" with corresponding priority levels of 1, 2, 3, meaning that read I/Os are ranked higher or take a higher priority than maintenance I/Os and maintenance I/Os are ranked higher or take on a higher priority than write I/Os. These priorities may also be associated with the seek energy setting at which one or more components will operate to execute the respective I/O request, as described in more detail below.

The seek energy setting component 107 associates a classification selected by the I/O classification component 101 with a seek energy setting is configured. The seek energy setting component 107 may also determine whether additional processing needs to occur based on the classification. For example, in response to determining that an incoming request is not a highest ranked or prioritized type of I/O, instead of immediately setting or configuring the seek energy setting, this component may contact the queue depth determining component 103. This component determines a depth of a queue associated with a storage area where the I/O request will be executed. For example, the queue depth determining component 103 may identify that there are over 20 pending requests that are waiting to perform work on the same volume as the request. The quantity of pending requests may be relayed or communicated back to the seek energy setting component 107. The seek energy setting mapping component 107 may then identify a set of rules associated with the queue depth that govern seek energy setting configuration. The seek energy setting component 107 may operate to compare the quantity of requests that are pending to one or more thresholds defined by the rules and responsively configures the seek energy setting. For example, a rule may indicate that a number of pending requests below a first threshold is set to a speed of X. A second rule may indicate a number of pending I/O request above the threshold is set to a speed of Y. A third rule may indicate a number of pending I/O request above a second threshold (e.g., higher than the other threshold) is set to a speed of Z.

Alternatively or additionally, the seek energy setting component 107 and/or the queue depth determining component 103 communicates with the queue ordering component 105 to determine what level to set the seek energy setting. The queue ordering component 105 identifies what position in a queue the received request is at in the queue where the request will be executed (and/or all other I/O requests pending in the queue). A queue organizes or schedules requests in a particular order to be executed in the particular order. For example, the queue may be a traditional FIFO data structure where requests are executed in the order they are received. Alternatively or additionally, the queue may be optimized such that requests are ordered according whether they are within a threshold distance from each other on a storage device, such as within the same or nearby sectors. For example, if a queue contains 5 pending requests that are within a threshold distance of each other, they may be batched together in the optimized queue to be processed together or sequentially notwithstanding they were not received together.

It is contemplated that the position that the I/O request (received by the I/O classification component 101) is in, within the queue, or the positions of some or each I/O request in the queue, are communicated back to the seek energy setting component 107. The seek energy setting component 107 may then query a set of rules used to set or configure the seek energy setting based at least in part on the order of the request(s) in the queue. For example, the rules may indicate that when a queue us at a depth of X (e.g., as determined by the queue depth determining component 103), particular I/O request at particular order thresholds are configured to particular seek energy settings. The rules may alternatively or additionally indicate that a first quantity or percentage of I/O requests next to be processed in the queue are configured to be set at a first seek energy setting, a second quantity or percentage of requests in the middle (and/or bottom) portion of the queue are configured to be set a second seek energy setting, etc. There may be any suitable quantity of pending requests that are set to any suitable seek energy setting. For example, each pending request may have its own seek energy setting.

The seek energy setting component 107 operates to configure the seek energy setting based on the queue depth determining component 103 functions, the queue ordering component 105 functions, and/or the specific classification. For example, for a particular request classified by the classification component 101, the seek energy setting component 107 may configure a first seek energy setting in response to receiving the queue depth from the queue depth component 103 and based on a first set of rules. However, the configured first seek energy setting can be modified in response to receiving information from the queue ordering component 105 and based on a second set of rules. For example, it may be determined that a queue depth is greater than a threshold, which may warrant a first seek energy setting. Additionally, the particular incoming request may be a highest priority that is at the first position in a queue to be processed before most other pending requests. Accordingly, due to the fact that the request is at the first position of a queue (and not in the last position) and is highest in priority, the configured seek energy setting can be increased even higher than the first seek energy setting.

The queue depth determining component 103 and the queue ordering component 105 are not contacted at all by the seek energy setting component 107. Rather, the seek energy setting component 107 may simply map a classification and priority level straight to a seek energy setting such that the seek energy adjustment component 109 directly causes one or more storage device components to perform at the set seek energy setting. For example, in response to the seek energy setting component 107 determining that the I/O classification ID is mapped to a highest speed level because it is in a highest priority class, the seek energy mapping component 107 may directly interface with the seek energy adjustment component 209 without communicating with the other components 103 and 105.

The seek energy adjustment component 109 (e.g., within a storage controller) directly causes one or more components of a storage device system to operate at a seek energy setting that matches the configuration set by the seek energy setting component 107. For example, in response to receiving a particular highest priority level 1 read request and receiving instruction from the seek energy setting component 107 that the seek energy level is the highest, the seek energy component 109 may cause a read/write head to shift to a highest available speed for seek time in order to locate a track where the level 1 read request data is located at on disk. In some embodiments, this causes a change in seek energy relative to a time prior to the seek energy adjustment component 109 executing the request at the particular seek energy setting. For example, at a first time a low priority request may be received, and the seek energy component 109 may responsively cause one or more storage device components to operate at a first level. At a second subsequent time, a high priority request may be received and the seek energy component 109 may responsively cause the one or more storage device components to operate at a second level, which rate is faster than the first level based on the particular I/O classification and priority of the request received at the second time.

Figure 2:
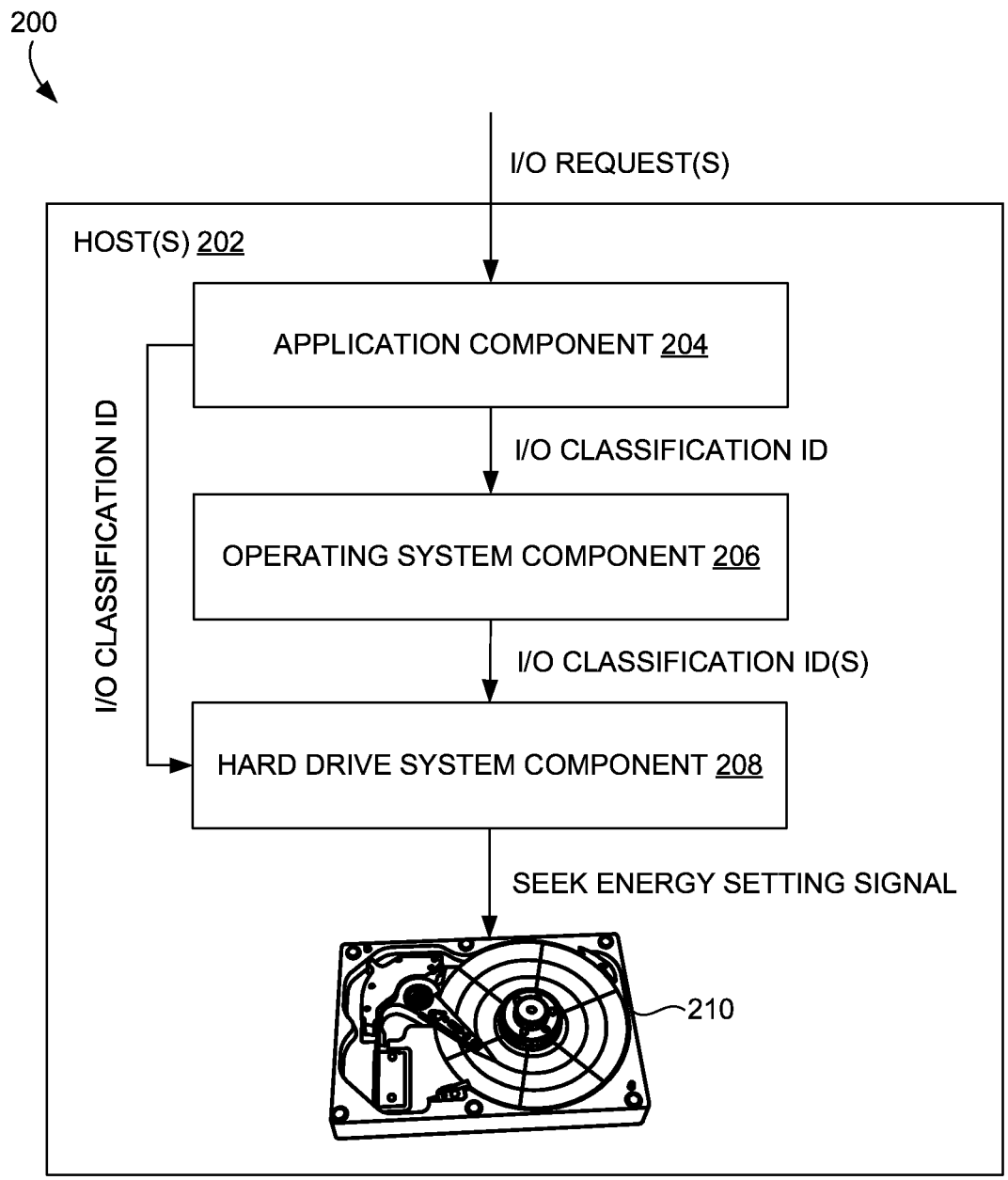
FIG. 2 is a block diagram of an example system, in which embodiments described herein may be employed.

With reference to FIG. 2. FIG. 2 is a block diagram of a system 200, according to embodiments. The system 200 includes one or more hosts 202 (e.g., a server computing device), an application component 204 (e.g., an application), an operating system component 206 (e.g., MICROSOFT WINDOWS and LINUX) and a hard drive system component 208 (e.g., a storage controller). One or more of the components in the system 100 of FIG. 1 may be included within one or more of the components of the system 200 of FIG. 2. For example, the I/O classification component 101 may be implemented within the application component 204 and/or the operating system component 206. In another example, the hard drive system component 208 includes the seek energy component 107, the queue depth determining component 103, the queue ordering component 105 and/or the seek energy adjustment component 109.

The application component 204 operates to receive requests. In response to the application component 204 selecting a classification for a corresponding request, the application component 205 transmits or communicates the I/O request classification ID to the operating system component 206. The application component 204 may alternatively bypass the operating system component 206 such that the I/O classification ID is transmitted directly to the hard drive system component 208 and not to the operating system component 206.

The operating system component 206 operates to select its own set of priority classifications in addition or in the alternative to the application component 204 priority classifications. For example, because an operating system in various instances manages a file system (and an application does not), the operating system component 206 can make other classifications, such as whether the request is for file system metadata or file system payload data. The operating system component 206 may prioritize file system metadata ahead of file system payload data. It is contemplated that when the operating system component 206 selects its own set of classifications and/or priority levels, the operating system component 206 can modify the classification or priority received from the application component 204 to a second classification or priority. Alternatively, the operating system component 206 does not modify the classification or priority received from the application component 204 but additionally selects its own set of classifications to transmit (along with the classifications received at the application component(s) 204) to the hard drive system component 208. As such, the operating system component 206 may use one or both sets of classifications to configure a seek energy setting at which one or more storage device components operate at to execute a request.

In an example illustration of how the operating system component 206 can modify the classification of requests received from the application component 204, the operating system component 206 may receive a first write I/O request and a classification ID of 2, which is indicative of a middle tier priority level. However, the operating system component 206 may associate the classification ID of 2 to a metadata read, which is higher in priority than a payload data read. Accordingly, the operating system component 206 may responsively change the ID and/or priority level to a 1, indicating that the priority is the highest or higher priority.

In some instances, the operating system component 206 provides the application component 204 with different abstractions or modifies application functionality (e.g., seek energy setting values). For example, vendor A may offer energy settings 1-5 but vendor B may offer settings 1-20. The operating system component 206 may accordingly provide the application component 204 with more settings (e.g., 1-1000) or less settings (e.g., high, med, low) and then translate those based on the HDD capabilities.

The hard drive system component 208 operates to receive the I/O classification IDs from the operating system component 206 and/or the application component 204 and set a seek energy setting at which one or more components of a storage device 210 will operate based on the priority classification of the received requests. The hard drive system component(s) 208 may communicate with the operating system component 206 and the application component 204 via any suitable protocol or standard. These protocols or standards provide rules or procedures for formatting and processing requests associated with classification. For example, this communication may be made via Serial Advanced Technology Attachment (SATA) or Serial Attached SCSI (SAS) standard protocols. In an example illustration of this specific communication, the hard drive system component 208 may receive a first classification ID from the operating system component 206 indicating that a read at a highest priority level was received. Additionally or alternatively, the hard drive system component 208 may receive a second classification ID from the operating system component 206 indicating that the same read request was payload data (as identified by an operating system) and thus the priority is not a highest priority.

The hard drive system component 208 may also operate to settle on a final request priority classification notwithstanding that two or more classification IDs have been received for a single request. Settling may occur because the application component 204, the operating system component 206, or the hard drive system component 208 may select different priority levels for the same I/O requests. For example, using the illustration above, the hard drive system component 208 may combine the classification or seek energy settings (e.g., take the average of the speed values) to arrive at a final classification or seek energy setting. For example, if one received classification ID from the application component 204 was 1 and another classification ID from the operating system component 206 was 2 and there were corresponding matching speed levels, the average, 1.5, may be used to configure the speed instead of 1 or 2. In this manner, the combined value causes a seek energy setting of one or more storage device components to operate at a level higher than 1 but lower than 2.

The hard drive system component 208 can include its own set of classification criteria alternative or additional to the set of criteria defined by the application component 204 and/or the operating system component 206. For example, there may be temperature sensor located at one or more storage device system components (e.g., a read/write head) that measures a temperature of the one or more components. The hard drive system component 208 may identify a lookup table or other data structure, which indicates what seek energy setting to select based on the temperature readings. For example, when one or more components are power throttled or are over a temperature threshold, it may be desirable to configure seek energy settings low such that there is not as much energy expended, thereby reducing the temperature of components.

The hard drive system component 208 may also combine priority classifications received from the application component 204, operating system component 206, and/or from its own classification criteria. For example, the application component 204 may transmit a classification ID to the operating system component 206 indicating a priority 1 (highest priority) for a particular read I/O request. This priority may also be transmitted from the operating system component 206 to the hard drive system component 208 (or another modified classification ID may be transmitted to the hard drive component 208). The hard drive system component 208 may then map the priority 1 to a highest level of seek energy at which storage device components may be configured to operate, such as a level 10 speed. The hard drive system component 208 may then identify a temperature that one or more hardware components are operating at. The hard drive system component 208 may then query a data structure that maps the specific temperature to an associated seek energy setting, such as 2, which may be indicative of a relatively low seek energy. The temperature may be over a threshold, such that the components are fairly hot. The hard drive system component 208 may then linearly combine the energy levels 1 and 2, such as adding or subtracting them together, multiplying, or averaging them together to arrive at a final classification and/or priority level.

The hard drive system component 208 may further strictly modify or change an I/O classification ID (and/or seek energy setting) received from the operating system component 206 or the application component 204. Instead of combining a seek energy setting based on different classification IDs received, the hard drive system component 208 may rather change the classification IDs and/or the mapped seek energy settings. For example, using the illustration above, instead of linearly combining the energy levels of 1 and 2, the hard drive system component 208 may select one or the other.

The hard drive system component 208 operates to transmit a seek energy setting signal to the one or more hardware storage device components of the hardware storage device 210 based on the seek energy configuration setting made. This causes the one or more hardware storage device components (e.g., a read/write head) to operate at a seek energy setting that the hard drive system component 208 configured the setting to be at to execute the I/O request(s) received by the application component 204.

Figure 3:
FIG. 3 is a schematic diagram of an example configuration table, in which embodiments described herein may be employed.

FIG. 3 is a schematic diagram of an example configuration table 300, where the configuration table 300 may be a lookup table or hash table that represents where seek energy settings are configured based on the priority level value. It is understood that although the table 300 is a specific data structure includes specific attributes and values, they are representative only. Accordingly, additional or different data structures (e.g., an ordered list) attributes or values may exist. In some embodiments, the table 300 or similar table is the data structure(s) queried by the hard drive system component(s) 208 of FIG. 2 or the seek energy setting component 107 to map priority levels to seek energy settings.

The configuration table 300 includes a priority level attribute and a seek energy setting attribute. As indicated under the priority level attribute of the configuration table 300, there are a plurality of priority level classifications—1, 2, $3_L$, $3_H$, and 5. As indicated under the seek energy setting attribute, there are a plurality of adjustable seek energy settings—10, 5, 2, 5, and 2. Each classification of the plurality of classifications are mapped to a respective seek energy setting of the plurality of seek energy settings. For example, within the record 300-1, the priority level 1 is mapped to the seek energy setting 10 by nature of these two values being within the same entry or record. In this manner, any priority level classification can be assigned to a particular I/O request and mapped to a seek energy setting. For example, an application component may receive a first I/O request, and select priority level "1" as the classification for the first I/O request. The application may transmit the priority level 1 value to a storage controller. The storage controller may then identify the matching value of 1 in the configuration table 300. Because the record 300-1 where the matching value is located indicates that the seek energy setting is 10, the system (e.g., the seek energy adjustment component 109) may then cause one or more storage device hardware components (e.g., a read/write head) to operate at the level 10 value.

The configuration table 300 indicates that for various priority level classifications identified, there are differing seek energy settings that are configured. The configuration table 300 also indicates that the higher the priority level a particular I/O request is, the higher the seek energy setting configuration will be set to. For example, a first I/O request may be identified as priority 2. The system may consequently cause one or more storage device hardware components to operate at a seek energy level of 5. Likewise, a second I/O request may be identified as a priority level 4. The system may consequently cause one or more storage device hardware components to change its rate to operate a lower seek energy of 2 instead of the 5. In like manner, a third I/O request may be identified as priority level 2. The system may consequently cause one or more storage device components to set the seek energy setting to 5, which is in between the 10 and 2 value. Accordingly, the table 300 illustrates a continuous priority and seek energy setting spectrum where each priority level and I/O request is categorized at and there is a corresponding seek energy setting.

The configuration table 300 also indicates similar priority level classifications of $3_L$ and $3_H$ that operate at different seek energy settings. In some embodiments, as indicated in this instance, some priority level classifications have sub-priorities to identify a corresponding seek energy setting. For example the "L" next to the 3 indicates that the queue depth is low or less than a threshold count (e.g., as determined by the queue depth determining component 103). Conversely, the "H" next to the other 3 indicates that the queue depth is high or greater than the threshold count. In these embodiments, when a queue depth associated with a particular I/O request is low, the seek energy setting configuration is lower relative to when a queue depth is high.

In an example illustration, the determination of "low" or "high" queue depth may be determined based on whether a count is less than or equal to a threshold count, such as 7 pending I/O requests. Continuing with this example, in response to receiving a first I/O request, with a priority level classification of 3, the system may then determine that the queue depth is 3 (less than the threshold 7). Accordingly, the system may responsively set the priority level to $3_L$. The configuration table 300 can then be accessed to map $3_L$ to 2 execute the first I/O request. In another example, in response to receiving a second I/O request, with a similar priority level classification of 3, the system may then determine that the queue depth is 9 (greater than the threshold 7). Accordingly, the system may set the priority level classification to $3_H$. A mapping may then be done to indicate that one or more components of the storage device should operate at a speed of 5 (instead of 2) to execute the second I/O request. The seek energy setting may be higher when a queue depth is high because this indicates that the system is getting backed up and one way to relieve the queue is to start executing I/O requests faster when the queue level is above a threshold.

FIG. 4 is a schematic diagram of a configuration table 400, according to some embodiments. In various embodiments, the configuration table 400 is the data structure used by seek energy component 109 and/or the hard drive system component(s) 208 to map classifications to seek energy settings. In some embodiments, the configuration table 400 is used alternatively or in conjunction with the configuration table 300 of FIG. 3. In some embodiments, only portions of the configuration table 400 are utilized for different components described herein. For example, in particular embodiments, the I/O classification attribute and the priority level attribute (and not the seek energy setting attribute) together represent a data structure used by the application component 201 or the operating system component 206. Likewise, these two attributes may represent a data structure used by the I/O classification component 101 of FIG. 1. Accordingly, a two-attribute data structure indicates that an incoming I/O request can be classified and then mapped to a particular priority level based on the classification of the I/O request. Although the configuration table 400 indicates a specific data structure, specific attributes and values, it is understood that this is representative only and that various data structures, values and attributes can be present.

The configuration table 400 represents that a particular I/O request can be mapped to a particular I/O category classification, a corresponding priority level, and a corresponding seek energy setting. Moreover, it is understood that any I/O category classification can alternatively or additionally be used according to vendor needs. For example, instead of the "block read" and "file and object" read being two different category classifications, in some embodiments, these represent a single I/O category classification, such as "data read".

As indicated in the configuration table 400, a "block read" is the highest priority I/O classification. A block read is a read from block or structured data (e.g., within a database). A "file and object read" is a data read operation of non-block data, data from multiple dimensions, or non-structured data (e.g., data not within a database), such as data reads from blogs, social media, etc. This data tends to be larger or more dimensional than block data and latency tends to be less crucial compared to block reads. A "maintenance task" may be any I/O, such as a read or write, but which is for the purpose of maintaining the proper functioning of data. Examples include, backing up data, rebuilding, mirroring, and/or any other administrative tasks. These tasks tend to be performed by administrative users, as opposed to end users that use applications associated with products or services, for example. A "data write" can include request to write, change, or append data to a storage device. For example, a data write may include a request that a customer makes to change his or her biographical information, such as change and address.

In an example illustration of how the configuration table 400 may be accessed, a user may select a button on a user interface, which requests a file from a database. The request may then be transmitted from the user computing device, over a computer network, to another computing device. This computing device may extract a classification ID from packet header information indicative of a block read. A component (e.g., the I/O classification component 101) may then assign or map the classification ID to a priority level value or ID within the configuration table 400, which is 1 or the highest priority level. Responsively, the priority level is then mapped to a corresponding seek energy setting, which is 15 meters per second. In some embodiments, this is indicative of the speed at which a read/write head is configured to operate at in order to locate a track for executing the corresponding block read I/O request. Continuing with the example above, responsively, a component (e.g., the seek energy adjustment component 109) causes a storage device system to operate at specific seek energy setting speed of 15 meters per second, which was set for executing the block read I/O request. The process may end by sending the file to the user computing device that requested it. This same process is repeated for other I/O requests received that fall under any of the other classifications. Accordingly, the configuration table 400 indicates that the speed of one or more storage device components can be constantly adjusting to execute I/O requests based at least in part on their classification. As described above, this both saves energy in the aggregate while at the same time speeds up execution for important I/O requests.

Figure 5:
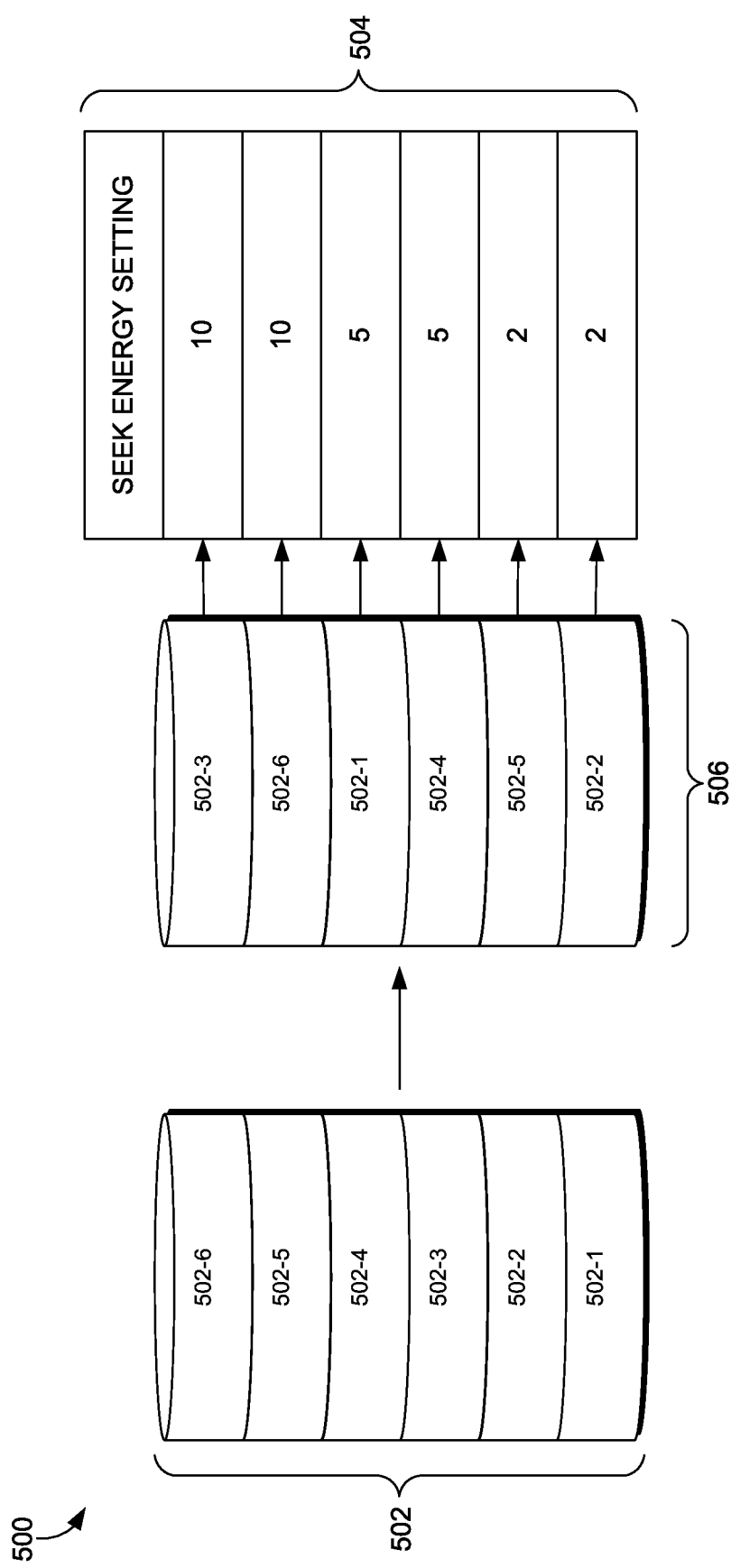
FIG. 5 is a schematic diagram of multiple queues, the entries of which are mapped to a corresponding seek energy setting, in accordance with embodiments described herein.

FIG. 5 is a schematic diagram of multiple queues, the entries of which are mapped to a corresponding seek energy setting, according to embodiments. In some embodiments, FIG. 5 represents functionality performed by the queue ordering component 105 and/or the queue depth determining component 103 of FIG. 1.

The queue 502 is a FIFO data structure with multiple entries (e.g., 502-6), each of which represent an I/O request that is pending in the order received. For example, entry 502-6 may be associated with an I/O request that was received first and is therefore scheduled to be processed first. However, the queue 506 illustrates an optimized queue data structure where the entries located in the first queue 502 have been shuffled according to any suitable criteria. For example, the queue 506 can be ordered based on a classification of the corresponding I/O request. In an illustrative example, the first two entries 502-3 and 502-6 can be associated with a first priority level, which is also associated with a highest seek energy setting 10. Likewise, the second two entries 502-1 and 502-4 are associated with a second priority level, lower in priority or not as important as the first priority level. And the last two entries—502-5 and 502-2—are associated with a third priority level, or lowest priority or importance. There are corresponding seek energy settings. Additionally or alternatively, the queue 506 is ordered based on other criteria in some embodiments, such as I/O request data that is near each other on a storage device. For example, entries 502-3 and 502-6 may be near each other and are thus executed together at the same speed level.

The seek energy setting table 504 illustrates differing levels that one or more components of a storage device system is configured to operate at to execute a corresponding I/O request based at least in part on the position each entry is at in the queue 506 (or alternatively in the queue 502). A plurality of I/O requests are processed based on a respective classification of a respective I/O request and a subset of I/O requests that are grouped together in the queue are set to be processed at a corresponding seek energy setting at which one or more components of a storage device system operates to execute the subsequent group of I/O requests. For example, the entries 502-5 and 502-2 are a group configured to be executed at the lowest seek energy setting available (i.e., 2). Whereas the entries 502-3 and 502-6 are configured to be executed at the highest seek energy setting available (i.e., 10). The other entries are also configured to be executed at middle-tier seek energy settings.

It is understood that although the table 504 represents that pending I/O request or entries can be processed at differing seek energy settings, in some embodiments, each entry of each queue associated with different storage areas can be processed at the same seek energy setting. For example, the queue 506 may represent a queue that is over a threshold depth or count of 5 entries (e.g., as determined by the queue depth determining component 103). Accordingly, each entry can be processed at a seek energy setting of 10. Continuing with this example, another queue (not shown) may be less than or equal to the same threshold depth or count of 5 entries. Accordingly, each entry can be processed at a seek energy setting at some level under 10. This is indicative that the entire queue of entries do not need to be processed as fast or expend as much energy as the queue 506 because the other queue is not as backed up compared to the queue 506.

Figure 6:
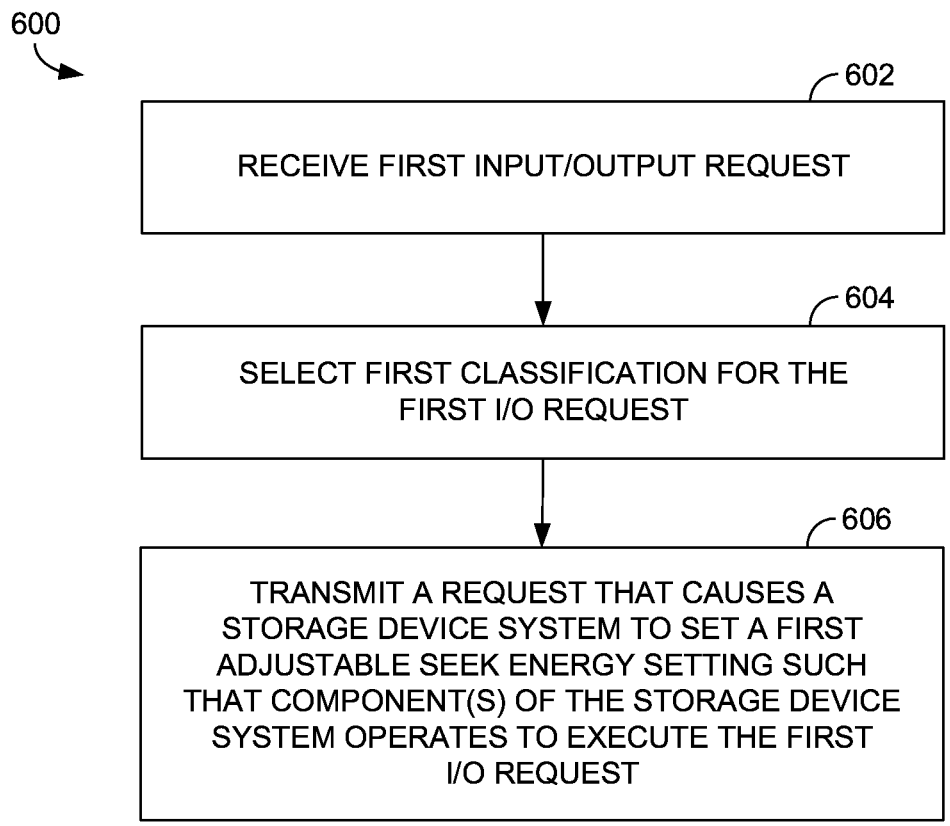
FIG. 6 is a flow diagram of an example process for selecting and transmitting a classification, which causes a storage device system to set an adjustable seek energy setting, in accordance with embodiments described herein.

FIG. 6 is a flow diagram of an example process 600 for selecting and transmitting a classification, which causes a storage device system to set an adjustable seek energy setting, according to embodiments. The process 600 (and/or any of the functionality described herein (e.g., process 700, 800, etc.) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product as described herein may perform or be caused to perform the processes 600, 700, 800 and/or any other functionality described herein. In some embodiments, some or each of the blocks of process 600 is performed by an application component and/or an operating system component of a system (e.g., the application component 204 of FIG. 2 and/or the operating system component 206 of FIG. 2).

Per block 602 first I/O requests are received (e.g., by the I/O classification component 101) for a storage device system (e.g., a hard disk drive system). For example, a user may issue a request from a user interface of a client device in order to update information to a database. The request may be transmitted, over a computer network, in one or more packets to one or more other computing devices. The one or more packets may include the type of I/O request. One or more classifications for the one or more I/O requests may then be selected (e.g., by the I/O classification component 101) via block 604.

The first request can be an application request for a read operation, a write operation, or a maintenance operation. As such, the application request is associated with an application running on an operating system such that the application, the operating system, and the storage device system are configured to process application requests having classifications that indicate the priority levels that correspond to adjustable seek energy settings. For example, FIG. 2 describes I/O application requests that are processed by the application component 204, the operating system component 206, and the hard drive system component 208. In an example illustration, an administrator may issue a command to rebuild one or more indexes. The command may be communicated and the system may associate a "maintenance" I/O classification to the request.

The first classification(s) may be one of a plurality of classifications. Each classification of the plurality of classifications indicates a priority level for executing the first request. The first priority level is associated with a first adjustable seek energy setting of a plurality of adjustable seek energy settings for executing requests on the storage device system, wherein a seek energy setting includes an adjustable operational setting for the storage device system. For example, referring back to FIG. 3 or FIG. 4, there are a plurality of classifications (e.g., "block read" "data scrubbing", and "priority level 1") included in the respective configuration tables, each of which are associated with a priority level at which any I/O request belonging to the classification should be processed relative to any other request. For example, with respect to FIG. 4, "block reads" should be processed before or more urgently than "file and object reads." Similarly "file and object reads" should be processed before or more urgently than "maintenance tasks." In some embodiments, the first classification(s) are indicative of at least an I/O request category classification that the first I/O request(s) belongs to. For example, referring back to FIG. 4, the category may be any of the classifications, such as "block read" and/or any of the priority levels, such as 1.

Selecting the first classification at block 604 is based on accessing a configuration table that includes a plurality of classifications having priority levels and the plurality of adjustable seek energy settings. Each of the plurality of classifications is mapped to a corresponding adjustable seek energy setting. For example, this is described with respect to the configuration table 300 in FIG. 3. The first classification may be further based on assigning the first classification to the first request based on the first classification being mapped to the first adjustable seek energy setting within the configuration table (e.g., as described in FIG. 3).

Selecting of the first classification for the first I/O request at block 604 can alternatively or additionally be based on a category classification of the request. The category classifications may correspond to predefined classifications for priority levels. For example, the category classification in some embodiments correspond to the I/O classifications described in the configuration table 400 of FIG. 4. For example, a classification category can be a "block read". The category classification in various embodiments is selected from one of the following: a read operation, a write operation, or a maintenance operation (e.g., as described in FIG. 4). In some embodiments, the priority levels are selected from one of the following: a high priority, a medium priority, and a low priority. For example, referring back to FIG. 4, the block read is a "high priority", the file and object read, maintenance tasks, and data scrubbing can all be labeled a "medium priority" and a data write can be considered a "low priority."

It is contemplated that the high priority is indicative of the first I/O request(s) needing to be urgently executed before any other I/O request of other types or within different classifications. The low priority level is indicative of the first I/O request(s) requiring a least amount of urgency for being executed relative to any other I/O request of other types or classifications. The medium priority is indicative of the first I/O request(s) needing to be executed not as urgently as the high priority; but more urgently than the low priority. In these embodiments, priorities are set with respect to how fast each classification of I/O requests needs to be processed relative to other classifications of I/O requests. Alternatively or additionally, in some embodiments, priorities are set with respect to the order in which I/O requests should be processed. For example, referring back to FIG. 5, the queue 505 may be ordered such that certain entries are processed before others depending on the classification and/or priority level.

Per block 606 the first classification associated with the first I/O request is transmitted (e.g., by the application component(s) 204 and/or the operating system component(s) 206) to cause the storage device system to set the first adjustable seek energy setting based on the first classification indicating the first priority level associated with the first adjustable seek energy setting. One or more hardware components of the storage device system operates to execute the first request based on the first adjustable seek energy setting.

The adjustable operational setting for the storage device system is a setting that causes a read/write head of the storage device system to change a rate for locating tracks corresponding to request. For example, referring back to FIG. 4, a first I/O request may be a block read, which is set to a priority level 1 and a 15 meters per second rate. A second I/O request may be a file and object read, which is set to a priority level 2 and a 10 meters per second rate. Accordingly, a read/write head rate can change from the 15 m/s to 10 m/s.

Transmitting the first classification can include an application communicating the first classification to an operating system. The operating system may then modify the first classification for the first request to a second classification. The operating system may communicate the first request having the second classification. Examples of the modifications are described with respect to FIG. 2.

The setting of the first adjustable seek energy setting can further be based on a que depth of a queue associated with a first storage area where the first request is executed (e.g., as described with respect to the queue depth determining component 103). The queue depth is a first quantity of requests that are pending within the queue.

It is contemplated that the process 600 is repeated for various I/O requests. For example, the process 600 may occur for a first I/O request. At a second time, a second I/O request is received. Then a second classification is generated for the second I/O request. The second classification can be the same or different than the first classification associated with the first I/O request. The second classification can also be associated with a higher (or lower or the same) priority compared to the first classification. Based at least in part on the second classification of the second I/O request, a second request is transmitted to the storage device system that is configured to case the storage device system to set a second seek energy setting at which one or more components of the storage device system operates to execute the second I/O request. In various embodiments, the second seek energy setting is higher (or lower or the same) than the first seek energy setting based at least in part on the second classification being associated with a higher (or lower or the same) priority than the first classification. For example, referring back to FIG. 3, five I/O request may be received that are prioritized at each of the levels 1, 2, $3_L$, $3_H$, and 4. Accordingly, the one or more components of the storage device may operate at each of the corresponding seek energy settings to execute the respective I/O request based at least in part on the priority level.

Figure 7:
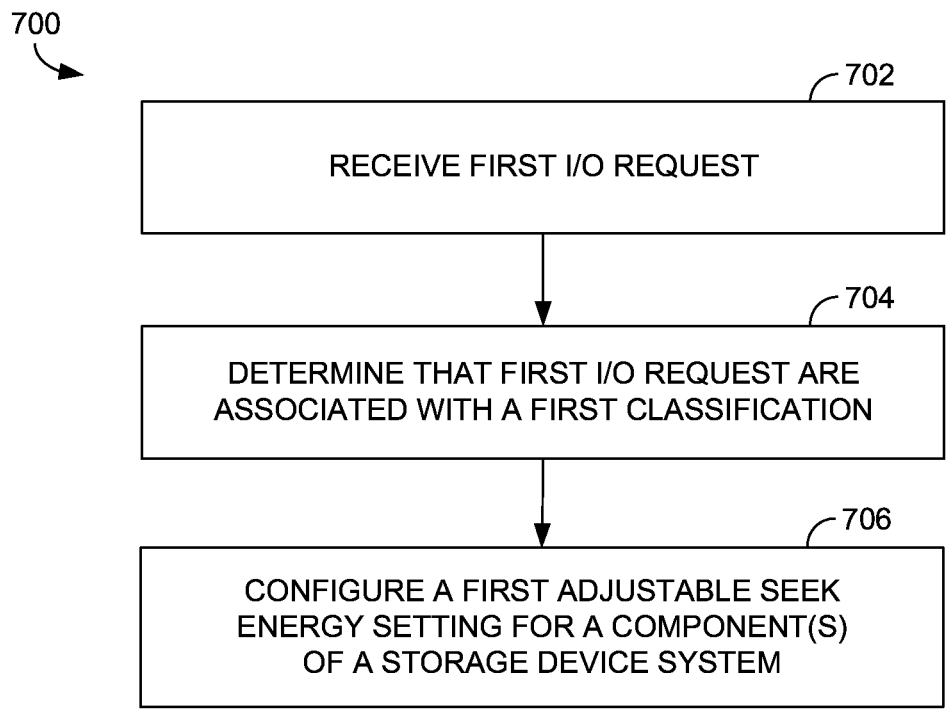
FIG. 7 is a flow diagram of an example process for configuration of a particular adjustable seek energy setting for one or more components of a storage device system, in accordance with embodiments described herein.

FIG. 7 is a flow diagram of a process 700 for configuration of a particular adjustable seek energy setting for one or more components of a storage device system, according to some embodiments. In some embodiments, some or each blocks of the process 700 is performed by a storage device component (e.g., the hard drive system component 208 of FIG. 2) of a system.

Per block 702 a first request is received, which is an I/O request received at a storage device system. The first request can be an application request or operating system request. The application request is associated with an application and the operating system request is associated with an operating system. An application, the operating system, and the storage device system are configured to process requests having classifications that indicate the priority levels that correspond to adjustable seek energy settings, as indicated in FIG. 2 for example.

Per block 704, it is determined that a first I/O request is associated with a first classification. In some embodiments, the determination that the first request is associated with a first classification is based on a storage device system protocol associated with the storage device system. The storage device system protocol provides the rules or procedures for formatting and processing requests associated with the classifications. For example, Native Command Queuing (NCQ), an extension of serial ATA protocol allows hard disk drives to internally optimize the order in which receive and write requests are executed. NCQ allows the hard disk drive itself to determine the optimal order in which to retrieve pending requests. This may allow the drive to fulfill all requests in fewer rotations and thus less time. This same or similar type of communication to a hard drive that allows it to provide an optimal order of request may also be used to communicate an I/O request or classification to a hard drive to configure seek energy settings based on the received classifications.

The storage device system protocol is associated with a configuration table that includes a plurality of classifications having priority levels and the plurality of adjustable seek energy settings. Each of the plurality of classifications is mapped to a corresponding adjustable seek energy setting. The configuring of the first adjustable seek energy setting for the one or more components of the storage device system is based on the first classification being mapped to the first adjustable seek energy setting within the configuration table. For example, tables identical or similar to the configuration tables 300 or 400 may be used by these protocols.

Per block 706, based on the first classification, a first adjustable seek energy setting is configured for one or more components of the storage device system. The one or more components execute the first request based on the first adjustable seek energy setting. For example, referring back to FIG. 3, if the priority classification is 1, this classification is mapped to its adjustable seek energy setting, via the configuration table 300, which is 10. Accordingly, one or more hardware components can execute the first request at the first adjustable seek energy setting.

A second request or set of request can be received at which new classifications are selected, which cause a change in the seek energy settings. For example, a second I/O request is received. It is determined that the second request is associated with a second classification that indicates a second priority level for executing the second request. A queue depth can then be accessed of a queue associated with a storage area where the second request is to be executed at. Based on the queue depth of the queue, a new classification for the second request is selected. The new classification includes the new priority level for executing the second request. The new priority level may be a higher priority level or a lower priority level. The new priority level may correspond to a new adjustable seek energy setting of the plurality of adjustable seek energy settings for executing requests on the storage device system. In some embodiments, based on the second classification indicating the priority level corresponding to the second adjustable seek energy setting, the second adjustable seek energy setting is configured for the one or more components of the storage device system.

Figure 8:
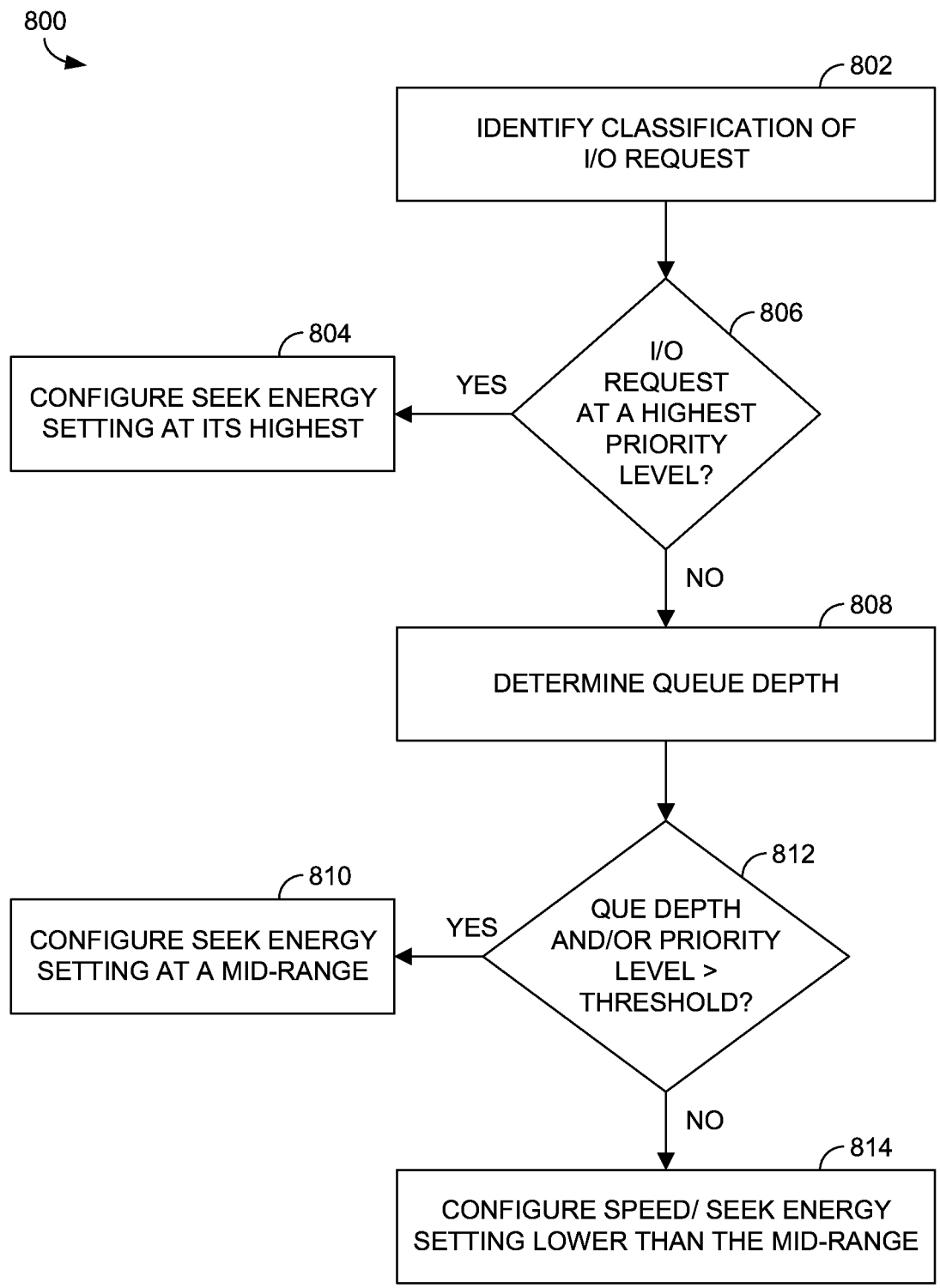
FIG. 8 is a flow diagram of an example process for configuring seek energy settings based on various criteria, in accordance with embodiments described herein.

FIG. 8 is a flow diagram of an example process 800 for configuring seek energy settings based on various criteria, according to embodiments. Per block 802 one or more classifications of one or more I/O requests are identified or selected (e.g., block 707 of FIG. 7). Per block 806, it is determined (e.g., by the I/O classification component 101) whether the one or more I/O requests are associated with a highest (e.g., most important) priority level. In some embodiments, determining whether an I/O request is associated with a highest priority level includes accessing a data structure and mapping the classification to a priority level. For example, referring back to FIG. 3 and FIG. 4, the highest priority levels are 1 for both configuration tables. Accordingly, any incoming classification can be mapped to a priority level in the respective data structure to determine if the value is less than or equal to 1, for example.

Per block 804, if the I/O request(s) is associated with a highest priority level the seek energy setting is configured to be at its highest. For example, referring back to FIG. 3, in response to an I/O request being prioritized the highest at level 1, the configuration of the seek energy setting is 10, which is higher than any of the other values—5 and 2 within the configuration table 300. Accordingly, one or more storage device system components may operate to execute the corresponding I/O request at the configured level (e.g., a read/write head operates 15 m/s to locate a track).

Per block 808, the queue depth of a queue associated with a storage area is determined (e.g., by the queue depth determining component 103). In these embodiments, the setting or configuring of a seek energy setting can be further based on queue depth. The queue depth is indicative of a particular quantity of I/O request that are pending (e.g., have not been executed) within a queue associated with a storage area (e.g., a volume). In an example illustration, referring back to FIG. 5, the system may determine that there are 6 pending requests within the queue 506 corresponding to the 6 entries.

Per block 812, it is determined (e.g., by the seek energy setting component 107) whether the queue depth and/or the priority level is greater (and/or equal) to one or more thresholds. In various embodiments, both the queue depth and priority levels are weighted or linearly combined to arrive at final seek energy setting configurations. In these examples, the higher a priority is, the higher the weight value assigned. The lower the priority the lower weight value that is assigned. Likewise, the higher the queue depth, the higher weight value assigned. The lower the queue depth, the lower weight value assigned.

For example, a first received I/O request may be associated with a second-to-highest priority level (2) (weight=5) but at a queue depth that is fairly shallow, such as 2 entries (e.g., weight=−1). Although the mapped priority level (e.g., within a data structure similar to 300) indicates that the seek energy setting is 5 (which is also its weight), this integer is reduced to 4 (5+−1) since the queue depth is shallow below a threshold. In another example, a second received I/O request may be associated to a third-to-highest priority level (3) (weight=4) but the queue depth may be extremely deep well over a threshold (e.g., contains 20 entries) (weight=3). Although the mapped priority level indicates that the seek energy setting configuration is 4, this integer is summed to 7 (4+3) since the que depth is extremely deep. In this manner, various I/O request can be executed at various speeds and/or energy levels directly proportionate to the specific I/O priority level and/or the specific queue depth. In various embodiments, additional or alternative determinations can be made at block 812, such as proximity I/O requests are to each other in a storage area and/or the exact queue position, as described with respect to the queue ordering component 105.

Per block 810, if the queue depth or the priority level is greater than one or more thresholds, the seek energy setting is configured to be set at one or more mid-range levels, which is below the highest level as indicated in block 804. A "mid-range level" may be any value that is not the highest seek energy setting or the lowest seek energy setting, but is in between these values. For example, referring back to FIG. 3, a first I/O request may be associated with a priority level classification of three, but which has a high queue depth ($3_H$). The seek energy setting may be responsively set to 5. Likewise, the priority level classification of 2 is mapped to the seek energy setting of 5. Per block 814, if the que depth and/or the priority level is not greater than one or more thresholds, one or more seek energy settings are configured at a level lower than the mid-range, such as the lowest level available. For example, referring back to FIG. 3, a first I/O request may be associated with a priority level of three, but which has a low queue depth ($3_L$). The seek energy setting may be responsively set to 2. Likewise, the priority level 4 is mapped to the seek energy setting of 2.

Figure 9:
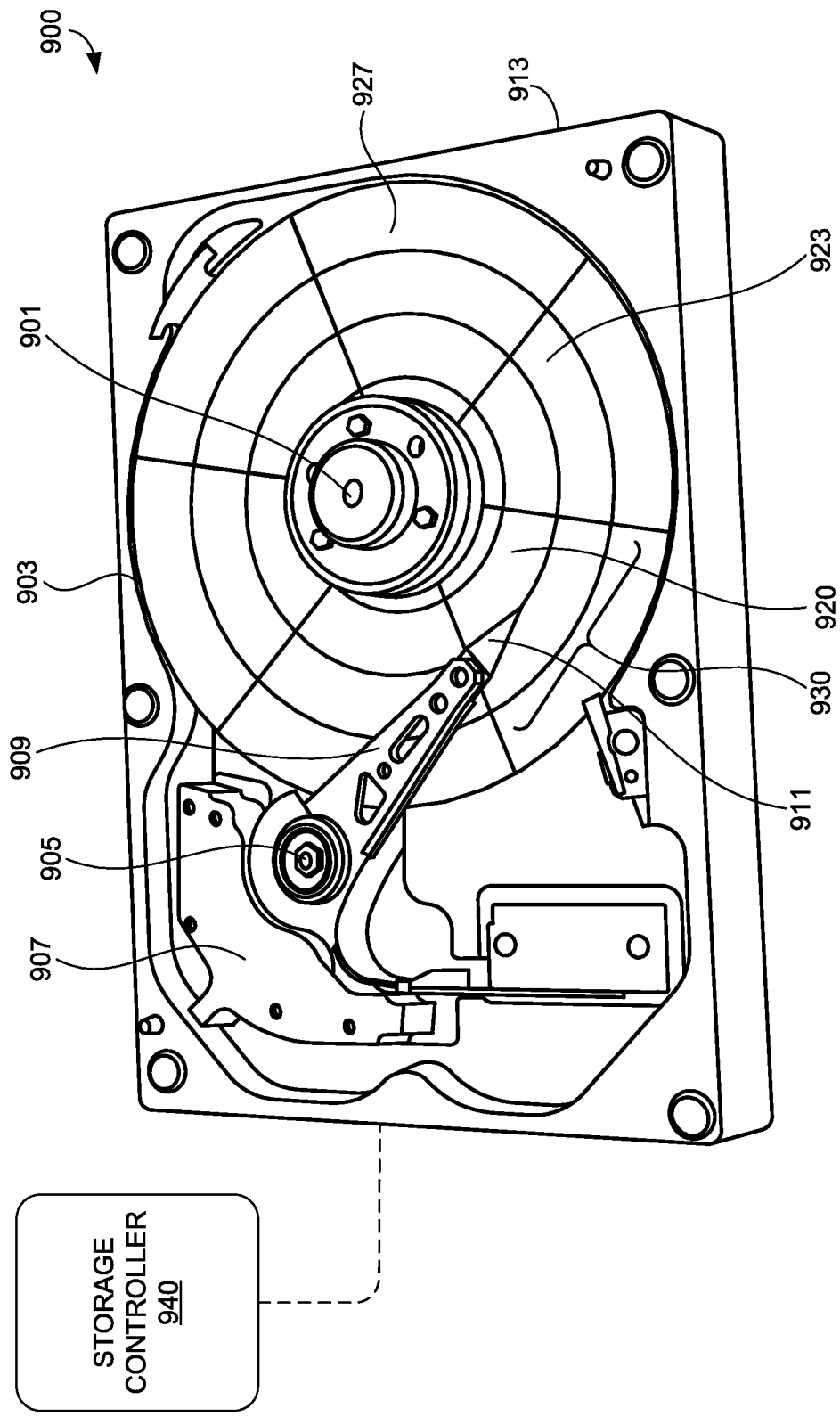
FIG. 9 is a schematic diagram of example hardware components of a hard disk drive storage device system, in which embodiments described herein may be employed.

FIG. 9 is a schematic diagram of example hardware components of a hard disk drive storage device system 900, according to embodiments. The storage device system 900 includes a storage device controller 940 that controls functionality of the components—an actuator 907, an actuator axis 905, an actuator arm 909, a read/write head 911 that reads data from or writes data to a magnetic disk called a platter 903, a driving motor called the spindle 901, and a hard drive case 913. The actuator 907 controls the position of the actuator arm 909 and the read/write head 911 to a correct track (e.g., track 920) within the platter 903. The axis 905 allows movement of the actuator arm 909 and read/write head 911 from the center of the platter 903 to the outer edge of the platter 903. The platter 903 rotates to a correct sector (e.g., sector 927) via the spindle 901. The platter 903 includes various tracks 920, 923, and 927 and various sectors (e.g., 927). A track is a concentric ring where data is stored. Each track is divided into sections called sectors (e.g., sector 927), which is the smallest physical storage unit or area on the platter 903. Each track has the same quantity of sectors. Each track shares common sectors. For example, there are three tracks 920, 923, and 927 within the sector 927. When data is written to or from the platter 903, the read/write head 911 moves to the appropriate track where the data is located and the spindle 901 causes the platter 903 to spin to the appropriate sector where the data is located. As described above, these mechanical processes to read or write can be expensive, particularly in terms of latency and energy.

As described herein, in various embodiments one or more components of a storage device system can operate or move at configured seek energy settings based at least in part on a classification of a request (e.g., via the seek energy component 109, via block 706 of FIG. 7, the components 210 of FIG. 2). This improves the energy and latency issues described above. One or more components within FIG. 9 can operate or move at the configured seek energy settings described above. For example, a user may issue an request to open a file. The request may be classified as a "data read" and prioritized at a level 1 or highest priority. The priority 1 level may then be mapped to a highest seek energy setting (e.g., via the configuration table 300 of FIG. 3). The storage device controller 940 of the storage device system 900 may responsively cause the actuator 907 to move the read/write head 911 at the specified highest seek energy setting in order to locate the track 920. In various instances, this causes seek time to be reduced. Seek time is the time it takes to move from one track to another. This causes the read/write head 911 to operate at a faster rate than it did prior to the configuring of the particular seek energy setting for certain classifications. Alternatively or additionally, the storage device controller 940 responsively causes the spindle 901 to rotate at the configured seek energy setting, which causes the platter 903 to also rotate at or substantially at the configured seek energy setting. In some instances, this causes the seek latency to be reduced. Seek latency is the time it takes for the platter 903 to spin or rotate to a correct sector. Accordingly, the spindle 901 can rotate at a faster rate than it did prior to the configuring of the particular seek energy setting.

In another example, a user may issue a request to change data within a file. The request may be classified as a "data write" and prioritized at a level 4 or the lowest priority. The priority 4 may then be mapped to a lowest seek energy setting (e.g., as indicated in FIG. 3). The storage device controller 940 may then responsively cause the actuator 907 to move the read/write head 911 at the specified lowest seek energy setting to locate a track. In this way seek time can become longer or the rate at which the read/write head 911 operates can change to a slower rate in various instances. This causes the read/write head to operate slower than it did prior to the configuring of the particular seek energy setting to save energy. Alternatively or additionally, the storage device controller 940 responsively causes the spindle 901 to rotate at the configured seek energy setting, which causes the platter 903 to also rotate at or substantially at the configured seek energy setting. Seek latency can be strategically increased in some instances. Accordingly, the spindle 901 can rotate slower or at a slower rate than it did prior to the configuring of the particular seek energy setting.

It is contemplated that other timing characteristics are improved alternative or additional to seek time or seek latency. For example, in some embodiments, access time is improved. Access time is the time when a command was issued (e.g., use issues a query), up through seek time and seek latency to the time data is transferred back to the user.

Although the storage device system 900 in FIG. 9 and other components described herein describe a hard disk drive storage system, it is understood that any suitable storage device system associated with any suitable storage device may exist. For example, the components in which the seek energy setting is configured to operate may be any suitable components of any nonvolatile storage device (e.g., solid state drives, floppy disks, magnetic tape, flash memory, read-only memory, etc.) and/or volatile storage device (e.g., RAM).

Figure 10:
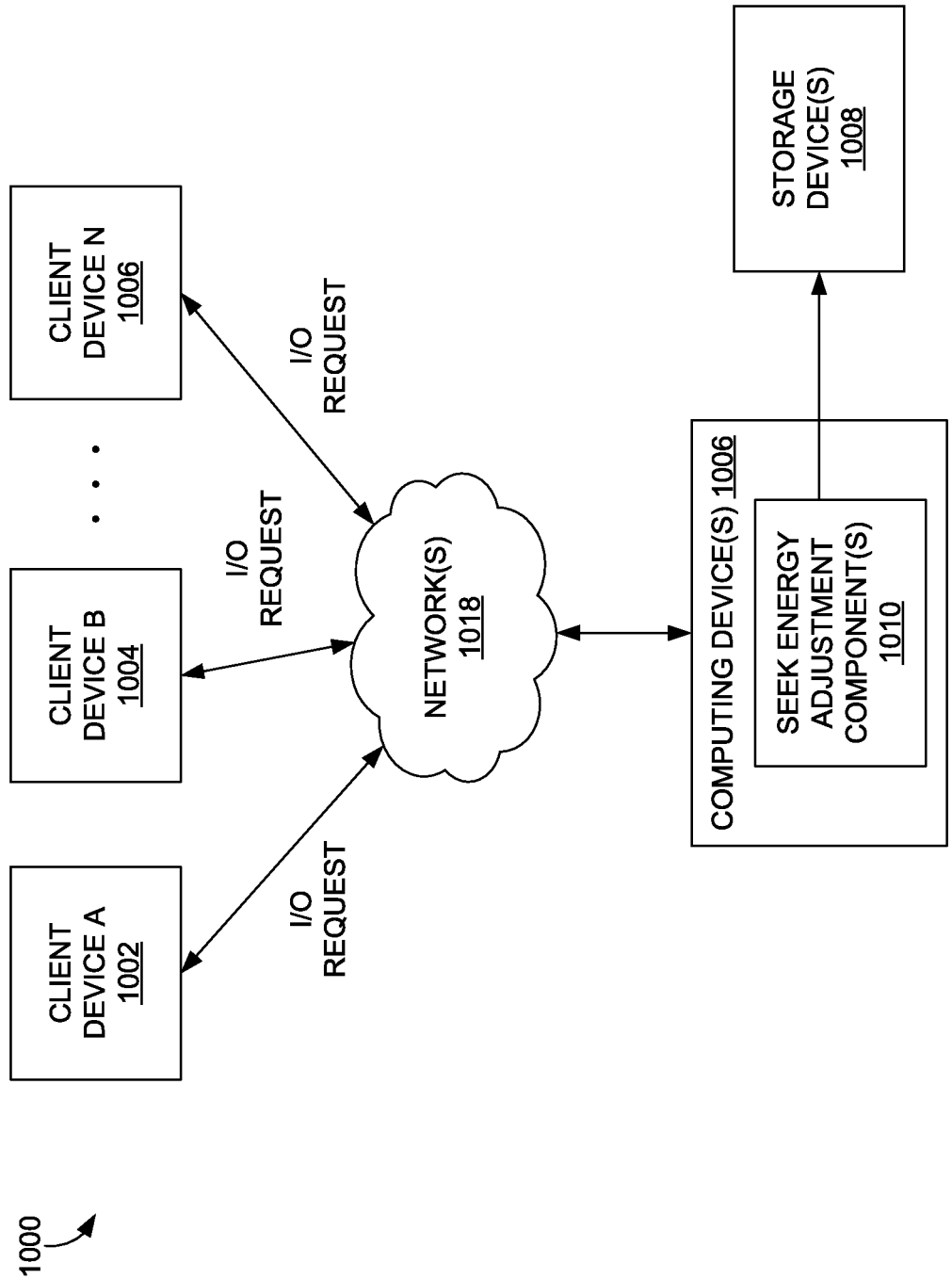
FIG. 10 is a block diagram of an example computing environment suitable for use in implementing embodiments described herein.

FIG. 10 is a block diagram of an example computing environment 1000 in which various aspects of the present disclosure are implemented within, according to embodiments. Although the computing environment 1000 includes particular components at a specific quantity, it is understood that any suitable components or quantity may exist. For example, in some embodiments, there is only one client device 1002 instead of multiple client devices. The computing environment 1000 includes the client device 1002, the client device 1004, the client device N, the one or more networks 1018, the one or more computing devices 1006, and the one or more storage devices 1008.

The client devices 1002, 1004, and N each issue one or more I/O requests, over the computer network(s) 1018. The components within the environment 1000 communicate with each other over one or more computer networks 1018 (e.g., public network or virtual private network "VPN"), which may include one or more wired and/or wireless connection protocols (e.g., IEEE 802.11). The network(s) 1018 may include, without limitation, one or more local area networks (LANs) and/or wide area networks (WANs). The client devices and/or the computing device(s) 1006 may include any type of computing device, such as the computing device 1100 described with reference to FIG. 11, for example.

The one or more computing devices 1006 receive the I/O requests from the client devices and execute or complete the requests. In some embodiments, the one or more computing devices 1006 includes some or each of the components or performs some or each of the functionality as described with respect to FIGS. 1-9. For example, referring back to FIG. 5, in response to receiving the I/O requests from the client devices 1002, 1004, and client device N, the computing device(s) 1006 stores the I/O requests as entries within the queue 502 and/or 505. Moreover, the one or more computing devices 1006 selects and maps one or more I/O classifications to priority levels (e.g., as indicated in FIG. 3 and/or FIG. 4). The one or more computing devices 1006 includes the seek energy adjustment component(s) 1010. In some embodiments, this includes the seek energy adjustment component 109 of FIG. 9 and/or the hard drive system component(s) 208 of FIG. 2. The seek energy adjustment component(s) 1010 adjust, configure, and/or cause one or more components of the storage device(s) 1008 to operate at a specified seek energy setting based at least in part on the particular classification and/or priority level of a particular I/O request (e.g., the I/O request from the client device 1002).

Figure 11:
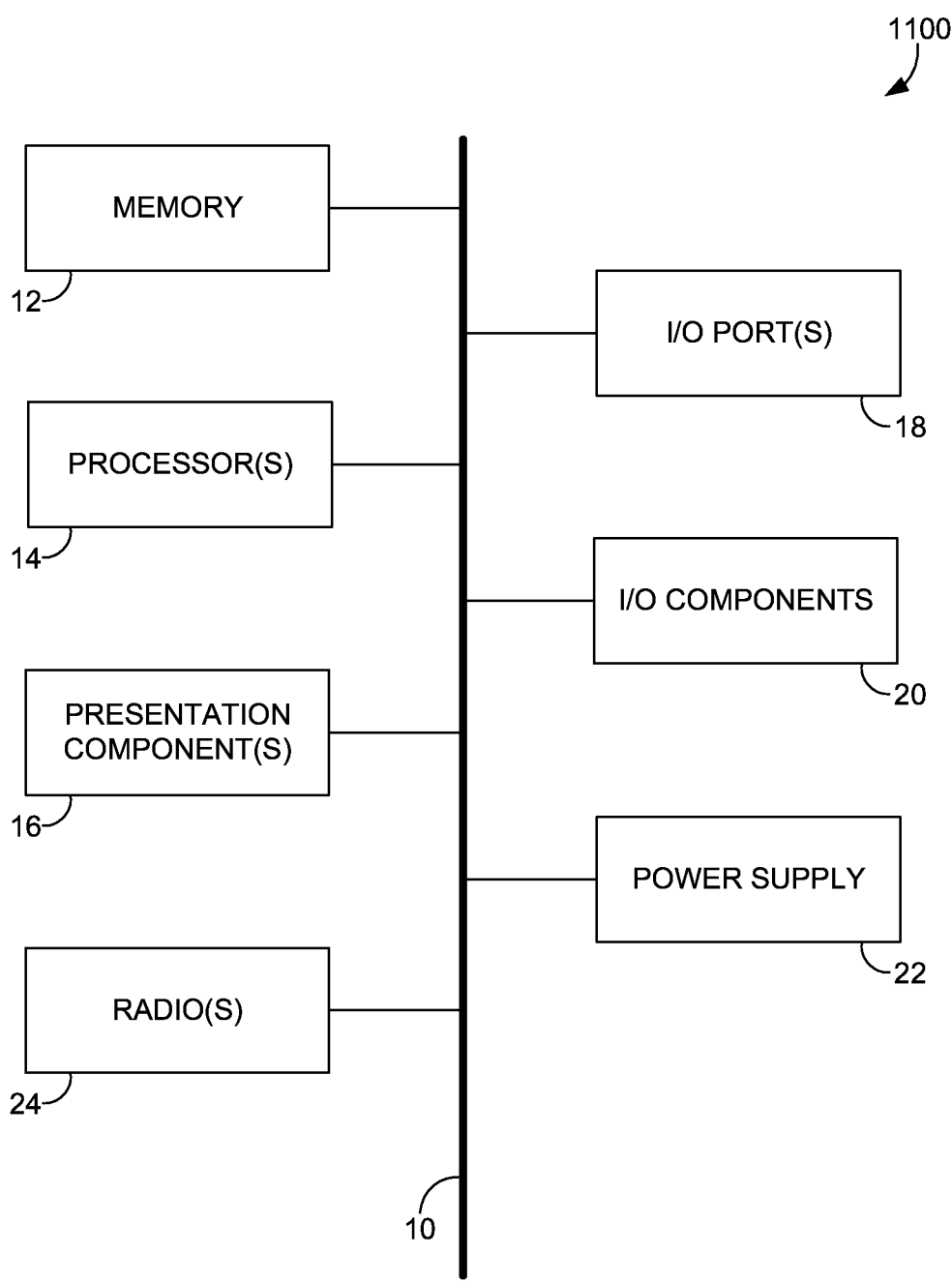
FIG. 11 is a block diagram of an example computing device suitable for use in implementing embodiments described herein.

With reference to FIG. 11, computing device 1100 includes bus 10 that directly or indirectly couples the following devices: memory 12, one or more processors 14, one or more presentation components 16, input/output ports 18, input/output components 20, and illustrative power supply 22. Bus 10 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 1100 to be logically coupled to other devices including I/O components 20, some of which may be built in. Illustrative components include a microphone, joystick, game pad, satellite dish, scanner, printer, wireless device, etc.

With reference to the classification based-adjustable seek energy setting system (e.g., as indicated in FIG. 2), components refer to integrated components for configuring seek energy based at least in part on the classification. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to an adjustable seek energy environment. Components can be configured for performing novel aspects of embodiments, where the term "configured for" can refer to "programmed to" perform particular tasks or implement particular abstract data types using code. Further, while embodiments of the present invention may generally refer to the on-demand secret distribution system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for implementing classification-based adjustable seek energy settings in storage device systems, the method comprising:

receiving a first request, wherein the first request is an input/output (I/O) request for a hard disk drive system;

selecting a first classification for the first request, wherein the first classification is selected from a plurality of classifications, wherein the first classification indicates a first priority level for executing the first request, the first priority level is associated with a first adjustable seek energy setting of a plurality adjustable seek energy settings for executing requests on the hard disk drive system, wherein a seek energy setting is an adjustable operational speed or energy setting for the hard disk drive system; and based on the first classification indicating the first priority level associated with the first adjustable seek energy setting, transmitting the first classification to cause the hard disk drive system to set the first adjustable seek energy setting, wherein one or more hardware components of the hard disk drive system operates to execute the first request based on the first adjustable seek energy setting.

2. The method of claim 1, wherein the first request is an application request for a read operation, a write operation, or a maintenance operation, wherein the application request is associated with an application running on an operating system, wherein the application, the operating system, and the hard disk drive system are configured to process application requests having classifications that indicate the priority levels that correspond to adjustable seek energy settings.

3. The method of claim 1, wherein selecting the first classification is based on:

accessing a configuration table that includes a plurality of classifications having priority levels and the plurality of adjustable seek energy settings, wherein each of the plurality of classifications is mapped to a corresponding adjustable seek energy setting; and assigning the first classification to the first request based on the first classification being mapped to the first adjustable seek energy setting within the configuration table.

4. The method of claim 1, wherein selecting the first classification is further based on a category classification of the request, wherein the category classification is selected from one of the following: a read operation, a write operation, or a maintenance operation, wherein category classifications correspond to predefined classifications for priority levels, wherein the priority levels are selected from one of the following: a high priority, a medium priority, and a low priority.

5. The method of claim 1, wherein the adjustable operational setting for the hard disk drive system is a setting that causes a read/write head of the hard disk drive system to change a rate for locating tracks corresponding to requests.

6. The method of claim 1, wherein transmitting the first request comprises an application communicating the first classification to an operating system, wherein the operating system modifies the first classification for the first request to a second classification, and wherein the operating system communicates the first request having the second classification.

7. The method of claim 1, wherein setting of the first adjustable seek energy setting is further based on a queue depth of a queue associated with a first storage area where the first request is executed, the queue depth is a first quantity of requests that are pending within the queue.

8. One or more hardware computer storage media having computer-executable instructions embodied thereon that, when executed, by one or more processors, cause the one or more processors to perform a method for implementing classification-based adjustable seek energy settings in storage device systems, the method comprising:

receiving a first request, wherein the first request is an input/output (I/O) request received at a storage device system;

determining that the first request is associated with a first classification, wherein the first classification indicates a first priority level for executing the first request, the first priority level corresponds to a first adjustable seek energy setting of a plurality adjustable seek energy settings for executing requests on the storage device system, wherein a seek energy setting is an adjustable operational setting for the storage device system; and based on the first classification, configure a first adjustable seek energy setting for one or more components of the storage device system, wherein the one or more components operates to execute the first request based on the first adjustable seek energy setting.

9. The one or more hardware computer storage media of claim 8, wherein the first request is an application request or operating system request, wherein the application request is associated with an application and the operating system request is associated with an operating system, wherein the application, the operating system, and the storage device system are configured to process requests having classifications that indicate the priority levels that correspond to adjustable seek energy settings.

10. The one or more hardware computer storage media of claim 8, wherein determining that the first request is associated with a first classification is based on a storage device system protocol associated with the storage device system, wherein the storage device system protocol provides the rules or procedures for formatting and processing requests associated with classifications.

11. The one or more hardware computer storage media of claim 10, wherein the storage device system protocol is associated with a configuration table that includes a plurality of classifications having priority levels and the plurality of adjustable seek energy settings, wherein each of the plurality of classifications is mapped to a corresponding adjustable seek energy setting; and wherein configuring the first adjustable seek energy setting for one or more components of the storage device system is based on the first classification being mapped to the first adjustable seek energy setting within the configuration table.

12. The one or more hardware computer storage media of claim 8, the method further comprising:

receiving a second request, wherein the second request is an I/O request received at the storage device system;

determining that the second classification is associated with a second classification, the second classification indicates a second priority level for executing the second request, the second priority level corresponds to a second adjustable seek energy setting of a plurality adjustable seek energy settings for executing requests on the storage device system;

accessing a queue depth of a queue associated with a storage area where the second request is to be executed, the queue depth is a first quantity of requests that are pending within the queue; and based on the queue depth of the queue, selecting a new classification for the second request, wherein the new classification indicates a new priority level for executing the second request, wherein the new priority level is a higher priority level or lower priority level, the new priority level corresponds to a new adjustable seek energy setting of the plurality adjustable seek energy settings for executing requests on the storage device system.

13. The one or more hardware computer storage media of claim 8, further comprising:

receiving a second request, wherein the second request is an I/O request received at the storage device system;

determining that the second classification is associated with a second classification, wherein the second classification is different from the first classification, the second classification indicates a higher priority level than the first classification, wherein the higher priority level corresponds to a second adjustable seek energy setting; and based on the second classification indicating the priority level corresponding to the second adjustable seek energy setting, configuring a second adjustable seek energy setting for the one or more components of the storage device system, wherein the one or more components operates to execute the second request based on the second adjustable seek energy setting.

14. The one or more hardware computer storage media of claim 8, further comprising:

receiving a second request, wherein the second request is an I/O request received at the storage device system;

determining that the second request is not configured with a second classification indicates a second priority level for executing the second request;

accessing a predetermined seek energy setting for the one or more components of the storage device system; and causing the one or more components to execute the second request based on the predetermined seek energy setting.

15. A system for implementing classification-based adjustable seek energy settings in storage device systems, the system comprising:

one or more processors; and one or more computer storage media storing computer-useable instructions that, when used by the one or more processors, cause the one or more processors to execute:

an application component or an operating system component configured to:

receive a first request;

select a first classification for the first request, wherein the first classification indicates a first priority level for executing the first request, the first priority level is associated with a first adjustable seek energy setting for executing requests on the storage device system, wherein a seek energy setting is an adjustable operational setting for the storage device system; and communicate with the storage device system to set the first adjustable seek energy setting, wherein one or more components of the storage device system operates to execute the first request based on the first adjustable seek energy setting.

16. The system of claim 15, wherein the first request is processed at the application component, the operating system component, and the storage device system based on a storage device system protocol that provides the rules or procedures for formatting and processing requests associated with classifications.

17. The system of claim 16, wherein selecting the first classification is based on accessing a configuration table that includes a plurality of classifications having priority levels and the plurality of adjustable seek energy settings, wherein each of the plurality of classifications is mapped to a corresponding adjustable seek energy setting, wherein the adjustable operational setting for the hard disk drive system is a setting that causes a read/write head of the storage drive system to change a rate for locating tracks corresponding to requests.

18. The system of claim 15, wherein transmitting the first request comprises the application component communicating the first classification directly to the storage device system without communicating with the operating system component, or the application component communicating the first classification via the operating system component to the storage device system, and
    wherein the operating system component is configured to:
        select a new classification for the first request, wherein the new classification indicates a new priority level for executing the first request, wherein the new priority level is a higher priority level or lower priority level, the new priority level corresponds to a new adjustable seek energy setting of the plurality adjustable seek energy settings for executing requests on the storage device system.

19. The system of claim 15, further comprising a storage device component configure to:
    receive the first request;
    determine that the first request is associated with the first classification; and
    configure the first adjustable seek energy setting for the one or more components of the storage device system, wherein the one or more component operates to execute the first request based on the first adjustable seek energy setting.

20. The system of claim 15, wherein the storage device system is further configured to:
    receive a second request;
    determine that the second classification is associated with a second classification, the second classification indicates a second priority level for executing the second request, the second priority level corresponds to a second adjustable seek energy setting;
    access a queue depth of a queue associated with a storage area where the second request is to be executed, the queue depth is a first quantity of requests that are pending within the queue; and
    based on the queue depth, select a new classification for the second request, wherein the new classification indicates a new priority level for executing the second request, wherein the new priority level is a higher priority level or lower priority level, the new priority level corresponds to a new adjustable seek energy setting of the plurality adjustable seek energy settings for executing requests on the storage device system.

\* \* \* \* \*